June 11, 1968 E. P. BRIGNAC 3,388,029
DIMENSIONALLY STABILIZED POLYAMIDE YARNS AND RUBBER
PRODUCTS REINFORCED THEREWITH
Filed Jan. 19, 1965

NYLON YARN CONTAINING CERTAIN POLYHYDRIC
ALCOHOLS AND REINFORCING A RUBBER ARTICLE.

NYLON YARN CONTAINING CERTAIN
POLYHYDRIC ALCOHOLS.

INVENTOR.
EDMOND P. BRIGNAC
BY
*Stanley M. Tarter*
ATTORNEY

United States Patent Office 3,388,029
Patented June 11, 1968

3,388,029
DIMENSIONALLY STABILIZED POLYAMIDE
YARNS AND RUBBER PRODUCTS REINFORCED THEREWITH
Edmond P. Brignac, Pensacola, Fla., assignor to Monsanto Company, St. Louis, Mo., a corporation of Delaware
Filed Jan. 19, 1965, Ser. No. 426,593
17 Claims. (Cl. 161—170)

This invention relates to dimensionally stabilized nylon yarn and rubber products reinforced therewith. More specifically, it pertains to dimensionally stabilized continuous multi-filament nylon yarn adapted for use as reinforcing elements in rubber products, as well as to such products.

Nylon is a long-chain synthetic polymeric amide having recurring amide groups as an integral part of the main polymer chain. The polyamide is capable of being formed into a filament in which the structural elements are oriented in the direction of the axis. Specific examples of nylon include nylon-66 (polyhexamethylene adipamide), nylon - 6 (polymeric 6 - aminocaproic acid), nylon - 610 (polyhexamethylene sebacamide), nylon-4, nylon-7, nylon-11, etc., and fiber-forming copolymers thereof.

As used herein relative viscosity means the ratio of absolute viscosity at 25° C. of a solution of nylon in 90% formic acid (90% formic acid and 10% water) to the absolute viscosity at 25° C. of the 90% formic as determined by a conventional procedure.

Polyamide yarns are widely accepted for many uses in purely textile materials; and, because of durability and high strength, are employed on a large scale for tire cord fabric. In spite of the numerous outstanding qualities of nylon tire cord, it has been virtually excluded from tires that are originally sold with new automobiles because of what is commonly referred to as "flat-spotting." An automobile equipped with nylon cord pneumatic tires, after having been driven and then parked for a few hours or overnight, will upon being driven again give a thumping or bumping sensation as the wheels turn. This occurs because the portion of the tire which had been in contact with the ground retains a flattened portion. The thumping sensation normally persists until the car has been driven a few hundred yards; thereafter, the bumping subsides. This "flat-spot" effect is usually more pronounced in the cold weather of winter than in the warmer weather of summer, presumably because of the greater temperature change to which the cord fabric is necessarily exposed; tires may attain a temperature of 65–75° C. in ordinary high speed driving.

The flat-spotting characteristic of nylon tire yarn has no known adverse effect upon the strength and durability of the tire, but the thumping is unpleasant to the passenger until the wheels have rolled sufficiently to eliminate the flat spot. For this principal reason automobile manufacturers have steadfastly refused to use nylon tires as original equipment even though nylon yarn-containing tires have certain advantages over tires reinforced with rayon. A prospective car buyer might be unfavorably influenced by an initially bumpy demonstration ride. Therefore, nylon cord tires, which have made great inroads into the replacement tire market, have not appreciably displaced rayon cord tires as original equipment even though the cord price differential is of much less importance than it once was.

Much research has gone into attempts to eliminate or reduce flat-spotting (dimensional instability) in tires reinforced with nylon yarn. Methods developed thus far are either inadequate or relatively expensive. Thus, more research has been necessary to discover and develop an effective and inexpensive method for dimensionally stabilizing nylon yarn.

It is, therefore, an object of this invention to provide a nylon yarn having increased dimensional stability.

Another object is to provide a rubber product reinforced with nylon yarn whose dimensional changes in response to repeated heating and cooling are substantially reduced.

Other objects will become apparent from the following descriptive material.

A melt-spun drawn continuous multi-filament nylon yarn of high total denier adapted for use as reinforcing elements in rubber products and whose dimensional changes in response to repeated heating and cooling are substantially reduced is produced by incorporating internally of nylon polymer prior to being melt-spun into filaments a small but dimensional stabilizing amount of a non-cyclic polar polyhydric alcohol containing 2 to 6 hydroxyl radicals and 2 to 12 carbon atoms and exhibiting a vapor pressure not greater than 100 mm. of Hg at 130° C. This yarn is characterized by having a tenacity of at least 6 grams per denier, a boil shrinkage of less than 9.5%, a dry retraction of less than 2.0% and a high molecular weight indicated by a relative viscosity of above 35.

To produce nylon yarn having increased dimensional stability in accordance with the invention, a non-cyclic polar polyhydric alcohol is intimately dispersed in molten nylon polymer which is then conventionally melt spun into filaments. The polyhydric compounds can also be introduced in the nylon-forming material either before, after, or during polycondensation. As indicated, the non-cyclic polar polyhydric compounds employed in practicing the invention contain from 2 to 6 hydroxyl radicals and 2 to 12 carbon atoms and have a vapor pressure not greater than 100 mm. of Hg at 130° C. A single polyhydric alcohol or mixtures of a plurality of polyhydric alcohols can be used to effect the dimensional stability desired. A few examples of materials that meet the above-described specifications are ethylene glycol, 1,2-propanediol, hexamethylene glycol, glycerol, 1,2,3-butanetriol, dipropylene glycol, triethylene glycol, sorbitol and others.

Figure 1:
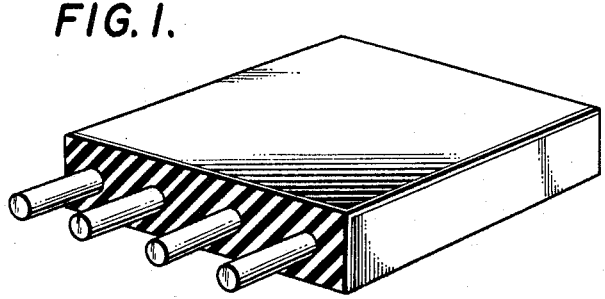
FIGURE 1 is a perspective view of a rubber article reinforced with nylon yarn internally containing a polyhydric alcohol.
Figure 2:
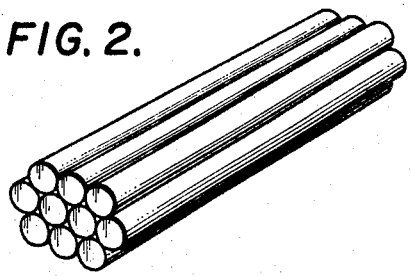
FIGURE 2 is a perspective view of multi-filament nylon yarn internally containing a polyhydric alcohol.

Nylon yarn can be made from nylon polymer having a relative viscosity above 35. But for use as reinforcing in rubber articles, especially tires, the relative viscosity of the polymer should be at least 40. To be effective as a rubber article reinforcement, nylon yarn having a small quantity of polyhydric alcohol contained therein should have a tenacity of at least 6 grams per denier but preferably at least 9 grams per denier.

To be effective in providing dimensional stability to polyamide yarns the non-cyclic polar polyhydric alcohol must be present in the yarn in a quantity less than about 5% by weight, but preferably in the range 0.25% to 2.5% by weight. The optimum concentration of polyhydric alcohol may vary somewhat with the molecular weight, configuration, and number of polar groups per mole of alcohol. The required amount is always relatively small. Beyond a certain "critical" quantity any appreciable excess appears to function merely as an ordinary plasticizer and may result in unfavorable yarn characteristics. As an example, for glycerol in nylon-66 about 0.75% to 1.0% by weight appears to be an optimum concentration range.

It is to be emphasized that the polyhydric alcohol must actually be placed internally of the nylon polymer. A small excess of the more volatile alcohols may be added to the polymer to insure that the requisite residual concentration is present in the polymer when it is spun.

The polyhydric alcohols may be added directly to the polymerizer system with the initial reactants, or be added when the polymerization reaction is nearly complete, or be added to the polymer next prior to the yarn spinning operation. It is preferable to make the alcohol addition as late in the polymerization process as is practicable, in order to insure avoidance of unnecessary complications, such as excessive foaming.

Many laboratory tests for yarn have been devised for predicting whether yarn will exhibit flat-spotting in finished tires. In general, these laboratory yarn tests have not been completely reliable. The only certain test is to actually construct tires in the usual manner and test them in road service on a car or on an indoor wheel laboratory apparatus. Data obtained using the indoor wheel test correlate well with actual road test data. The wheel test is expensive and time-consuming but is at present the simplest, wholly reliable test method for determining the degree of flat-spotting.

Raw tire yarn is twisted, plied into cord, dipped, and then hot-stretched. The cord is incorporated in the carcass of a tire which is then formed and cured, all of these steps being standardized and well known in the art of tire manufacturing. The finished tire is mounted on a standard wheel and tire rim. The axle of the wheel is pivoted so that the effective load may be adjusted, and the wheel engages a tread-mill of rollers such that each revolution of the wheel subjects the tire to the same deformations as occur in actual road service. Accelerated durability tests may be made by overloading the axle, with or without underinflation of the tire. A speedometer indicates the speed of rotation and an odometer records the equivalent distance traveled. In this manner actual road tests are closely simulated.

For flat-spot determination the test tire is mounted on the test wheel under standard load and with normal inflation pressure. The wheel is then driven at a speed of 60 m.p.h. for the equivalent of 20 miles, during which out-of-roundness and cold-set is worked out, and a stable temperature level is reached. The wheel is stopped and the tire diameter is measured in several positions to determine the smallest or minimum radius of the tire. The wheel is then run an additional 10 miles at 60 m.p.h., making a total equivalent travel of 30 miles. The wheel is stopped and allowed to cool under load for two hours. Again the minimum radius of the tire is measured. The difference between the initial radius measured at the end of the 20 mile run and the radius after cooling is the measure of flat-spotting. The "flat-spot" is expressed in mils (thousandths of an inch). Flat-spot tests of this type were used with the yarns described in the examples set forth hereinafter.

Typical flat-spot measurements for high quality tires with rayon tire cord are about 75 mils; for polyethylene terephthalate tire cord about 80–90 mils; and for nylon-6 or nylon-66 tire cord about 200–210 mils. Tires with measured flat-spot below about 125 mils provide a smooth riding automobile, although the specific type of tire construction may change this numerical requirement slightly.

Two different polymerization processes were employed in preparing the nylon-66 polymer used for spinning the yarns cited in the examples: batch and continuous, both of which are well known in the synthetic fiber industry.

In the batch process a fixed quantity of nylon-66 salt (polyhexamethylene adipamide) as a 75% solution in water is charged to an autoclave. A small quantity of monobasic acid, such as acetic acid, may be added to stabilize the ultimate molecular weight or viscosity level of the polymer. Other additive components may be charged initially or be injected into the autoclave later as the polymerization reaction proceeds. The autoclave is closed and its temperature is raised until the autogenous pressure reaches about 250 p.s.i.g. Residual water of solution and water of condensation are bled off for a set period of time; thereafter, pressure is reduced to atmospheric while the temperature of the polymer is gradually increased and then controlled at a fixed level until polymerization is complete. Finally the autoclave is pressurized with an inert gas, and polymer is extruded as a broad ribbon that is quenched and subsequently chipped into flake or diced into pellets. The flake is then remelted and spun into yarn.

The continuous polymerization process received nylon-66 salt solution continuously, and the stages of polymerization are accomplished as the material flows through appropriate vessels. Additive materials are pumped or injected into the process stream at appropriate points. Polymer from the final stage of the reaction passes to a spinning head and is converted directly into yarn.

As noted previously, it is preferred to add the polyhydric alcohol late in the polymerization cycle since this minimizes any adverse effect on the polymerization reaction rate. In the batch process the polyhydric alcohol is preferably added to the autoclave while ebullition of escaping water of reaction is still sufficiently vigorous to provide mixing in the polymeric mass.

It is also feasible to add the polyhydric alcohol at the spinning unit. Depending upon the specific structure of the spinning machine, the alcohol may be injected into the melt just prior to the spinning head by means of a metering pump. For existing batch spinning machines it is practicable to simply coat the flakes or pellets of polymer with polyhydric alcohol using a drum tumbler or blender. Ease of adapting the process of the invention to standard, existing equipment is a major advantage of the process.

A number of examples are set forth next below to illustrate the invention more fully. However, these examples are not intended to limit the scope of the invention in any manner whatsoever.

EXAMPLE I

A preliminary test run was made by spinning a standard 840 denier, 140 filament tire yarn by the batch process. Undelustered nylon-66 polymer flake having a relative viscosity of 40 was placed in a stainless steel drum to which glycerol was added in an amount to yield 0.66% glycerol by weight on the polymer. The drum was mounted on a tumbler, and rotated end-over-end for 15 minutes to thoroughly distribute glycerol over the surface of the flake.

The glycerol-coated flake was spun into yarn on a one-position spinning machine under normal conditions of 300 y.p.m. (yards per minute). A quantity of the same kind of plain flake, uncoated with glycerol, was also spun into yarn under similar conditions to provide a control yarn. Test and control yarns were then drawn and twisted at 5.35 machine draw ratio on a standard RG-6 Whitin drawtwister.

Samples of drawn yard were subjected to two tests. The "boiled shrinkage" and the "dry retraction" of the yarn were determined. In these tests, 90 meters of yarn is wound into a skein. The skein loop length is measured initially. For the boiled shrinkage test the skein contained in a cheese cloth bag is placed in boiling water for 70 minutes, then centrifuge-dried for 5 minutes, and then exposed to conditioned air having 72% relative humidity for 24 hours. For the dry retraction test the skein is simply conditioned in the air with 72% relative humidity for 24 hours. After these treatments the skein loop lengths are remeasured. The differences between the initial loop lengths and the lengths after treatment yield both value for boil shrinkage and the value for dry retraction as a fraction of the original lengths. These and other relevant data of the test and control yarn were determined to be as follows in Table 1.

TABLE 1.—YARN TEST DATA

|  | Control | Test |
| --- | --- | --- |
| Glycerol, percent | 0 | 0.66 |
| Denier | 847 | 858 |
| Tenacity, gm./denier | 8.25 | 7.9 |
| Elongation, percent | 17.7 | 17.5 |
| Boil Shrinkage, percent | 10.0 | 8.8 |
| Dry Retraction, percent | 2.36 | 1.15 |

From the above data it can be observed that the presence of the glycerol led to about a 12% reduction in boil shrinkage and 51% reduction in dry retraction. From the well-known fact that heating or annealing drawn nylon yarn reduces the boiled shrinkage and dry retraction thereof, it is clear that the presence of glycerol gives a functional result equivalent to the application of heat.

It was also observed that the test yarn dyed several shades darker than control yarn when the yarns are dyed with the same type of dye under similar conditions. This is an additional advantage in purely textile applications.

EXAMPLE II

Nylon-66 polymer was made by the batch process in the amount of 250 pounds of polymer per batch. An approximately 75% aqueous solution of nylon-66 salt was charged to an autoclave, together with common additives of ionic copper and potassium iodide for heat stabilization. Glycerol was added along with the initial charge of nylon salt. One batch contained an additional ingredient, 1.1% by weight of the commonly known sulfonamide plasticizer "Santicizer-8," manufactured by Monsanto Company, and which is composed of 87–91% N-ethyl o- and p-toluene sulfonamide and 9–13% o- and p-toluene sulfonamide. This plasticizer is frequently used to improve the flow characteristics of polyamide melts, but by itself does not make a significant improvement in the flat-spotting behavior of nylon yarns. Polymerization was carried out by standard procedures with the pressure reduction from 250 p.s.i.g to atmospheric being extended over a period of 90 minutes with a final temperature of 265° C. The polymer was then held at 20 inches of Hg vacuum for 20 minutes before being restored to atmospheric pressure. The polymer was finally extruded into a ribbon and cut into flake. The flake had a light tan color.

Each of the test polymer batches was spun into 840 denier, 136 filament yarn on a grid spinning machine operated at 294° C. and 350 y.p.m. spinning speed. The spun yard was drawn and twisted on a RG-6 Whitin drawtwister at machine draw ratios in the range 4.78 to 5.01 to yield nominally 840 denier, 136 filament tire yarn with 0.3 turn per inch Z-twist. One sample of yarn was made simply by coating plain polymer flake with glycerol and spinning as in Example I.

The items of yarn were plied together, dipped, and hot-stretched to form tire cords which were used to make standard construction 2-ply tires. Tires constructed from each item of yarn were then submitted to the 30 mile, 60 m.p.h. wheel test for flat-spotting. A summary of relevant data follows in Table 2.

TABLE 2.—TEST DATA SUMMARY

| Item | A | B | C | D | Control |
|---|---|---|---|---|---|
| Glycerol, percent | 0.5 | 1.0 | ¹1.0 | ²1.0 | 0.0 |
| Yarn Denier | 893 | 868 | 888 | 847 | 847 |
| Dry Retraction, percent | 1.33 | 1.36 | 1.33 | 1.41 | 2.36 |
| Boil Shrinkage, percent | 8.02 | 7.95 | 8.19 | 8.01 | 10.0 |
| Flat-spot, mils | 121 | 109 | 120 | 115 | 210 |

¹ Plus 1.1% "Santicizer-8." ² Glycerol-coated flake.

It is to be noted from the above summary that flat-spotting in every instance is reduced to the level required for tires considered to have acceptable flat-spotting levels. Dry retraction is consistently low. The presence of the plasticizer, "Santicizer-8," made no material difference in flat-spotting, suggesting that the glycerol clearly is not functioning merely as an ordinary plasticizer.

Each of the tires was next submitted to a steaming treatment known to reduce flat-spotting in normal nylon tire cord. The tires were exposed to saturated steam at 25 p.s.i.g (131° C.) for four hours, and after cooling were again measured for flat-spotting by the 30 mile, 60 m.p.h. wheel test to give these results:

TABLE 3.—WHEEL TEST DATA SUMMARY

| | A | B | C | D |
|---|---|---|---|---|
| Flat-spot, mils | 112 | 115 | 116 | 106 |
| Flat-spot change, mils | −9 | +6 | −4 | −9 |

These data indicate that steaming introduced only a minor change in flat-spotting of yarn containing glycerol.

EXAMPLE III

A pilot plant continuous polymerization unit was used to produce nylon-66 tire yarn containing several different concentrations of glycerol. Normal operating conditions were used throughout the process. Glycerol was added directly to the nylon salt solution that was charged continuously to the unit. Small quantities of ionic copper and potassium iodide and other standard tire yarn additives were also present in the polymer. Polymer was pumped directly to a two-position spinning machine.

Standard 840 denier, 140 filament tire yarn was spun at a spinning speed of 330 y.p.m. using a 140 hole spinneret, the entire spinning operation being conducted in a routine manner. After sufficient spun yarn for each given concentration of glycerol had been collected, the concentration of glycerol in the reactant stream to the polymerizer was changed. After steady state conditions at the new glycerol concentration had been reached, spun yarn was again collected for subsequent treatment. One additional variation was involved: normally tire yarn is wound up directly after passage from the spinneret through cooling air and ambient air; in this instance the yarn was exposed to open steam during its passage to the wind-up bobbin. Ordinarily, such "conditioning steam" is applied only in spinning fine denier textile yarns to improve the stability of the wound bobbin.

During spinning, the odor of hot glycerol was noticeable in the region of the spinneret, indicating that some glycerol was being lost by evaporation from the hot filament surface. In the tabulation below (Table 4), the concentrations indicated are based on the actual quantity of glycerol added to the reactor. These figures are therefore slightly high since it seems evident that a small quantity of glycerol was lost during the continuous polymerization and spinning operations. This observation points out the desirability of introducing glycerol near the end of the polymerization reaction just prior to the spinning head to reduce exposure time under evaporative conditions.

The spun yarn was drawn and twisted on a RG-7 Whitin draw-twister. Draw ratio was reduced as the concentration of glycerol in yarn increased, a 4.54 machine draw ratio being used for yarn containing nominally 1.5% glycerol. This trend of reduced draw ratio was in line with the reduction in yarn relative viscosity that accompanied the increase in glycerol concentration.

Each item of 840–140 yarn was plied, dipped, hot-stretched, and formed into tires of standard construction. The tires were submitted to the 30 mile, 60 m.p.h., and 2-hour cooling, wheel test for flat-spotting. These results and other data are shown in the table below; the previously mentioned conditioning steam in spinning was used with all yarns except items J, K, and L.

TABLE 4—RESULTS AND DATA FOR FLAT-SPOT TESTS

| Item | E | F | G | H | I | J | K | L |
|---|---|---|---|---|---|---|---|---|
| Glycerol, percent | 0.25 | 0.5 | 0.75 | 1.0 | 1.5 | 0.5 | 1.0 | 1.0 |
| Relative Viscosity of yarn | 71 | 68 | 66 | 64 | 62 | 68 | 64 | 64 |
| Flat-spot, mils | 157 | 135 | 125 | 128 | 143 | 120 | 140 | 139 |

Although the flat-spot is significantly smaller than for standard tire yarn there is considerable variation, and only three items (G, H, and J) are at an acceptable level. This erratic variation in the data is believed to be a result of the previously mentioned uncontrolled evaporation of glycerol during polymerization and spinning. The actual residual glycerol in the yarn is, therefore, appreciably less than the indicated quantity.

EXAMPLE IV

Another series of runs was made on the continuous polymerization unit under conditions essentially the same as outlined in Example III above. The stabilizer additives were again added directly to the nylon salt solution charged continuously to the polymerizer unit. Samples of the resultant 840-denier yarns were tested for boil shrinkage and dry retraction by the procedures previously mentioned. The results are given in the following table:

TABLE 5

| | Item | | | |
|---|---|---|---|---|
| | M | N | O | P |
| Additive | None | Glycerol | 1,2,6 hexanetriol | Triethyleneglycol |
| Amount, wt. percent | | 1.5 | 1.0 | 0.25 |
| Boil Shrinkage, percent | 10.2 | 7.75 | 8.74 | 9.49 |
| Dry Retraction, percent | 2.5 | 1.54 | 1.90 | 2.11 |

These data again illustrate the reduction in boil shrinkage and dry retraction when stabilizer additive is added to the polymer prior to conversion into yarn. The data also indicates that the additive must be present in a sufficient quantity, usually about 1%.

This invention provides quite significant advantages. By far the most significant advantage, of course, is that nylon yarn is made more dimensionably stable. Thus, tires produced therefrom have a reduced tendency to flat-spot. The materials employed to achieve the above noted result, dimensional stability, are quite inexpensive. Furthermore, from a process viewpoint, it is easy to add a polyhydric alcohol to polymer precursors before polymerization or to polymer during polymerization. There is no necessity to provide new and expensive equipment to produce the yarn of the invention as is necessary with some other proposed dimensionally stabilizing procedures. The dimensional stability produced with the polyhydric alcohols of the invention is reasonably permanent with the obvious advantages inherent in such a characteristic. The yarn has a reduced tendency for build-up of static electricity. Molten polymer when extruded into filaments by the melt-spinning process shows an increase in the rate of crystallization as the molten streams of polymer cool and solidify. Having this property the polymer containing the polyhydric compounds of the present invention is particularly suitable for melt spinning into filaments having a non-circular cross-section. For example, under similar conditions, nylon containing the polyhydric compounds can be melt spun by extrusion through a Y-shape orifice and more closely retain the shape of the orifice than nylons not containing such compounds. Nylon yarns containing the polyhydric compounds also have increased dyeability.

Although the invention has been described by referring to specific embodiments and procedures, it must be understood that the invention is to be broadly construed and limited solely by the reasonable scope of the appended claims.

What is claimed is:

1. A melt-spun continuous multi-filament nylon yarn of high total denier whose dimensional changes in response to repeated heating and cooling are substantially reduced, characterized by having a tenacity of at least 6 grams per denier, a boil shrinkage of less than 9.5%, a dry retraction of less than 2.0% and a high molecular weight indicated by a relative viscosity of at least 35 and particularly characterized by containing internally when melt spun a small but dimensional stabilizing amount of a non-cyclic polar polyhydric alcohol having 2 to 6 hydroxyl radicals and 2 to 12 carbon atoms and exhibiting a vapor pressure not greater than 100 mm. of Hg at 130° C., and wherein the polyhydric alcohol is present in a quantity in the range of 0.25%–5% by weight.

2. The yarn of claim 1 wherein the quantity of alcohol is in the range of 0.25–2.5% by weight.

3. The yarn of claim 2 wherein the polyhydric alcohol is glycerol.

4. The yarn of claim 2 wherein the polyhydric alcohol is ethylene glycol.

5. The yarn of claim 2 wherein the nylon is nylon-66.

6. The yarn of claim 2 wherein the nylon is nylon-6.

7. An article of manufacture reinforced with a melt-spun continuous multi-filament nylon yarn whose dimensional changes in response to repeated heating and cooling are substantially reduced, the reinforcing yarn being characterized by having a tenacity of at least 6 grams per denier, a boil shrinkage of less than 9.5%, a dry retraction of less than 2.0% and a high molecular weight indicated by a relative viscosity of at least 35 and particularly characterized by containing internally when melt spun a small but dimensional stabilizing amount of non-cyclic polar polyhydric alcohol having 2 to 6 hydroxyl radicals and 2 to 12 carbon atoms and exhibiting a vapor pressure not greater than 100 mm. of Hg at 130° C., and wherein the polyhydric alcohol is present in a quantity in the range of 0.25–5% by weight.

8. The product of claim 7 wherein the quantity of alcohol is in the range of 0.25–2.5% by weight.

9. The product of claim 8 wherein the polyhydric alcohol is glycerol.

10. The product of claim 8 wherein the polyhydric alcohol is ethylene glycol.

11. The product of claim 8 wherein the nylon is nylon-66.

12. The product of claim 8 wherein the nylon is nylon-6.

13. A method of producing nylon yarn whose dimensional changes in response to repeated heating and cooling are substantially reduced comprising:
    (a) shaping into a multi-filament yarn molten nylon polymer containing about 0.25–2.5% by weight of a non-cyclic polar polyhydric alcohol having 2 to 6 hydroxyl radicals and 2 to 12 carbon atoms and exhibiting a vapor pressure not greater than 100 mm. of Hg at 130° C., said polymer having a relative viscosity of at least 35; and
    (b) drawing the resulting multi-filament yarn to obtain a yarn with a tenacity of at least 6 grams per denier, a dry retraction of less than 2.0% and a boil shrinkage of less than 9.5%.

14. The method of claim 13 wherein the polyhydric alcohol is glycerol.

15. The method of claim 13 wherein the polyhydric alcohol is ethylene glycol.

16. The method of claim 13 wherein the nylon is nylon-66.

17. The method of claim 13 wherein the nylon is nylon-6.

References Cited

UNITED STATES PATENTS 3,218,222   11/1965   Skeen et al. _____ 161—227

ROBERT F. BURNETT, *Primary Examiner.*

L. M. CARLIN, *Assistant Examiner.*